United States Patent [19]
Bu

[11] Patent Number: 5,374,123
[45] Date of Patent: Dec. 20, 1994

[54] THERMAL COMFORT SENSING DEVICE

[75] Inventor: Jong U. Bu, Seoul, Rep. of Korea

[73] Assignee: Goldstar Co., Ltd., Seoul, Rep. of Korea

[21] Appl. No.: 63,784

[22] Filed: May 19, 1993

[30] Foreign Application Priority Data

May 20, 1992 [KR] Rep. of Korea ............... 8553/1992
Feb. 12, 1993 [KR] Rep. of Korea ............... 1969/1993

[51] Int. Cl.$^5$ ............... G01K 7/00; H01L 31/02; H01L 25/00
[52] U.S. Cl. ............... 374/109; 374/178; 257/467
[58] Field of Search ............... 374/109, 113, 178, 179, 374/208; 257/467

[56] References Cited

U.S. PATENT DOCUMENTS

| | | | |
|---|---|---|---|
| 3,294,988 | 12/1966 | Packard | 257/467 |
| 3,456,112 | 7/1969 | Webb | 374/178 |
| 3,566,690 | 3/1971 | Ebrahimi | 374/178 |
| 3,872,418 | 3/1975 | Plough et al. | 257/467 |
| 4,125,012 | 11/1978 | Madsen | 374/109 |
| 4,890,932 | 1/1990 | Kobayashi et al. | 374/109 |
| 5,059,543 | 10/1991 | Wise et al. | 257/467 |
| 5,102,230 | 4/1992 | Kobayashi et al. | 374/109 |

FOREIGN PATENT DOCUMENTS

| | | | |
|---|---|---|---|
| 357017882 | 1/1982 | Japan | 374/109 |
| 360148171 | 8/1985 | Japan | 257/467 |
| 402188962 | 7/1990 | Japan | 257/467 |

*Primary Examiner*—Diego F. F. Gutierrez
*Attorney, Agent, or Firm*—Finnegan, Henderson, Farabow, Garrett & Dunner

[57] ABSTRACT

A temperature comfort sensing device and a method for manufacturing the same, capable of achieving comfortable air conditioning by detecting an average temperature comfort sensitivity to a room environment and thus analogizing a correct predicted mean vote value. The temperature comfort sensing device comprises a lower diaphragm having a thin film heater and a temperature sensor, and an upper diaphragm having a plurality of thermocouples, a room temperature sensor and a black body. Alternatively, the temperature comfort sensing device comprises a single diaphragm having a thin film heater and a temperature sensor. Directly formed over the single diaphragm are a plurality of thermocouples, a room temperature sensor and a black body. The sensor is based on a model of the human body, with the thin film heater corresponding to an internal heat exchanging mechanism of a human being. The thermocouples serve to sense a skin temperature condition.

16 Claims, 13 Drawing Sheets

THERMAL COMFORT SENSING DEVICE

BACKGROUND OF THE INVENTION

1. Field of the Invention

The invention relates to sensors applicable for an air conditioning apparatus such as a cooler or heater and, more particularly to a temperature comfort sensing device suitable for obtaining a comfortable air condition by detecting a temperature sensitivity that a typical human being feels on the average.

2. Description of the Prior Art

Generally, a comfortable air condition is dependent upon factors such as air temperature, humidity, radiation rate, air flow, dust (a contamination level), smell, and cleanliness.

For obtaining the comfortable air condition, it is, therefore, necessary to develop sensors capable of detecting human conditions and environments surrounding human beings, and to develop operating mechanisms for carrying out control methods for processing signals from the sensors and achieving various operations.

Recently, an attempt for obtaining a comfortable air condition has been made in air conditioning appliances, in particular, air conditioners, using a predicted mean vote (PMV) value analogized by virtue of the development of neural networks and fuzzy controls, instead of conventional simple temperature controls.

A PMV value is the value which quantitatively expresses as a scale of language the sense of temperature that a person feels and is represented as a function of temperature, radiation rate (wall temperature), humidity, air flow, dress amount and, metabolic rate.

Table 1 shows examples of PMV values. As apparent from Table 1, human beings feel comfortable at a PMV value range of $-0.5$ to $+0.5$.

TABLE 1

| Value of PMV | Temperature Sensation |
|---|---|
| +1 | Cold |
| +2 | Cool |
| +1 | Slightly cool |
| 0 | Neutral |
| −1 | Slightly warm |
| −2 | Warm |
| −3 | Hot |

PMV = f(temperature, radiation rate, humidity, air flow, dress amount, metabolic rate)

Figure 1:
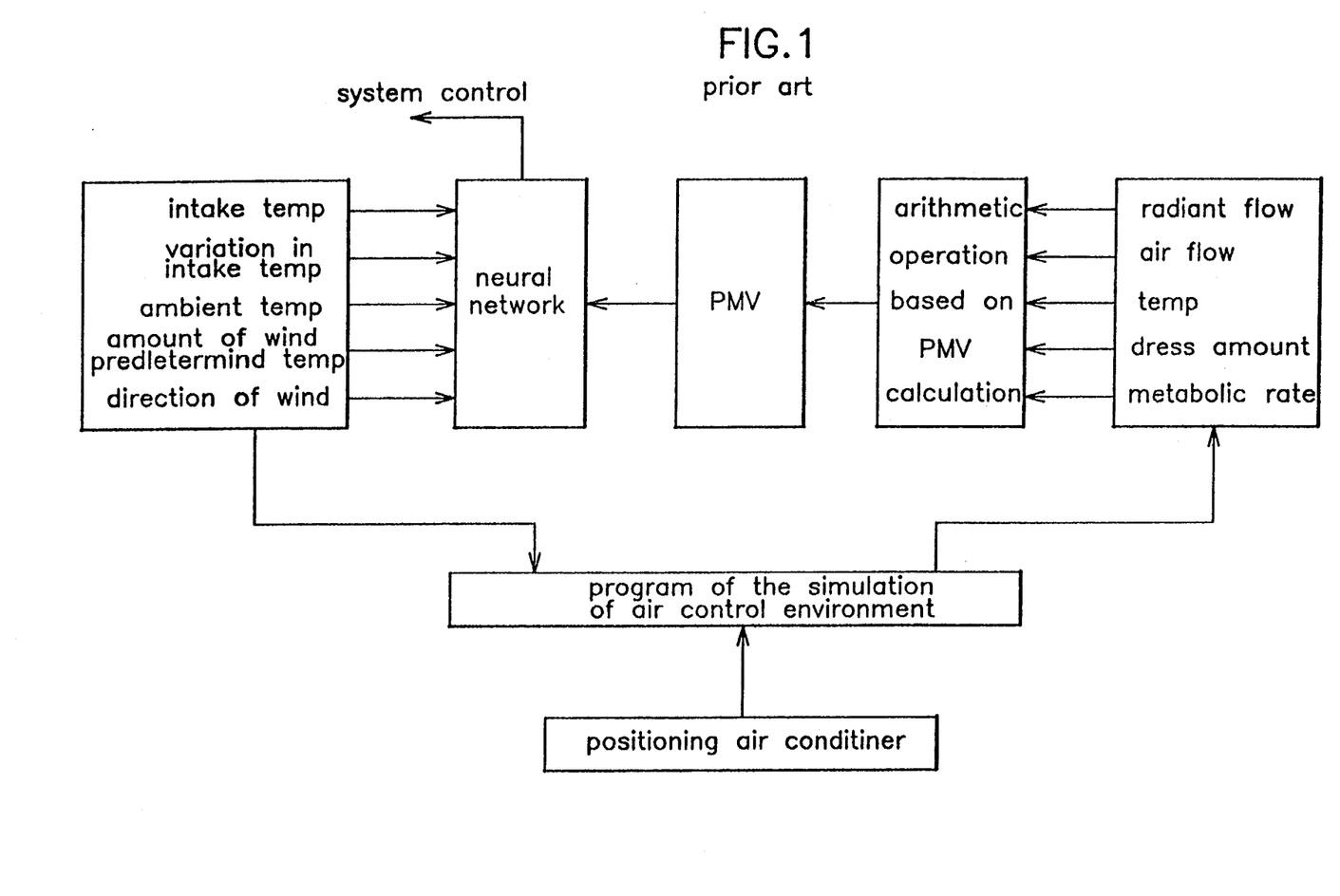
FIG. 1 is a block diagram illustrating an air conditioner control learning procedure carried out by a neural network in a conventional air conditioner.

FIG. 1 is a block diagram illustrating a temperature control running process of an air conditioner performed by a conventional neural network.

Referring to FIG. 1, PMV variables are deduced from the simulation of an air conditioning environment by measuring basic physical amounts such as intake temperature, variation in intake temperature, ambient temperature, amount of wind, predetermined temperature and direction of wind and inferring dress amount, and metabolic rate. There are a number of difficulties in deducing the PMV variables because it is complicated to interpret the flow of a fluid (an air) and the temperature of an air conditioning environment and because tests for many cases are required.

Also, needed are various sensors such as temperature sensors to measure intake temperature, exhaust temperature and ambient temperature, current sensors to get exhaust amount and hall devices to sense RPM of a motor because much information is demanded for the temperature control by the neural network.

In addition, because the PMV values are indirectly calculated in spite of using so many sensors, a quantity of simulation programs are needed, and an error rate is high in an arithmetic operation based on PMV calculation. There may, for example, be a defect to show many deviations, in that an inference of the radiation rate is based on ambiguous data so that it may vary depending on the assumption about or the state of positioning an air conditioner.

SUMMARY OF THE INVENTION

It is an object of the invention to provide a temperature comfort sensing device capable of directly detecting a room environment in-situ and calculating a correct PMV value to obtain a comfort air conditioning, and a method for manufacturing the same.

It is another object of the invention to provide a temperature comfort sensing device that is inexpensive and is produced at a high production rate, and a method for manufacturing the same.

In accordance with the present invention, these object can be accomplished by providing a temperature comfort sensing device comprising: a lower diaphragm having a recessed structure at a central portion of its lower surface, said lower diaphragm also including a thin film heater for generating a heat, depending on a room temperature, and a temperature sensor for controlling a temperature of said thin film heater; and an upper diaphragm having a recessed structure at a central portion of its lower surface, said upper diaphragm also including a plurality of thermocouples for generating an electromotive force, depending on said heat generated from the thin film heater.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Generally, a human being's temperature control mechanism is similar structure to a type of heat exchangers. The mechanism serves to emit heat occurring in the body through the skin or a respiratory organ to achieve a heat equilibrium, and thus maintain constant the temperature of the core of human body (brain, internal organ). A kind of a biological heat equation may be established between a human being and an ambient thermal environment. The preferred embodiments of the present invention makes it possible to acquire the information about a satisfaction level that a person feels in a thermal environment and about a temperature sense, measuring an imaginary skin temperature in the use of dummy derm type sensor designed by modeling a human body.

Figure 2:
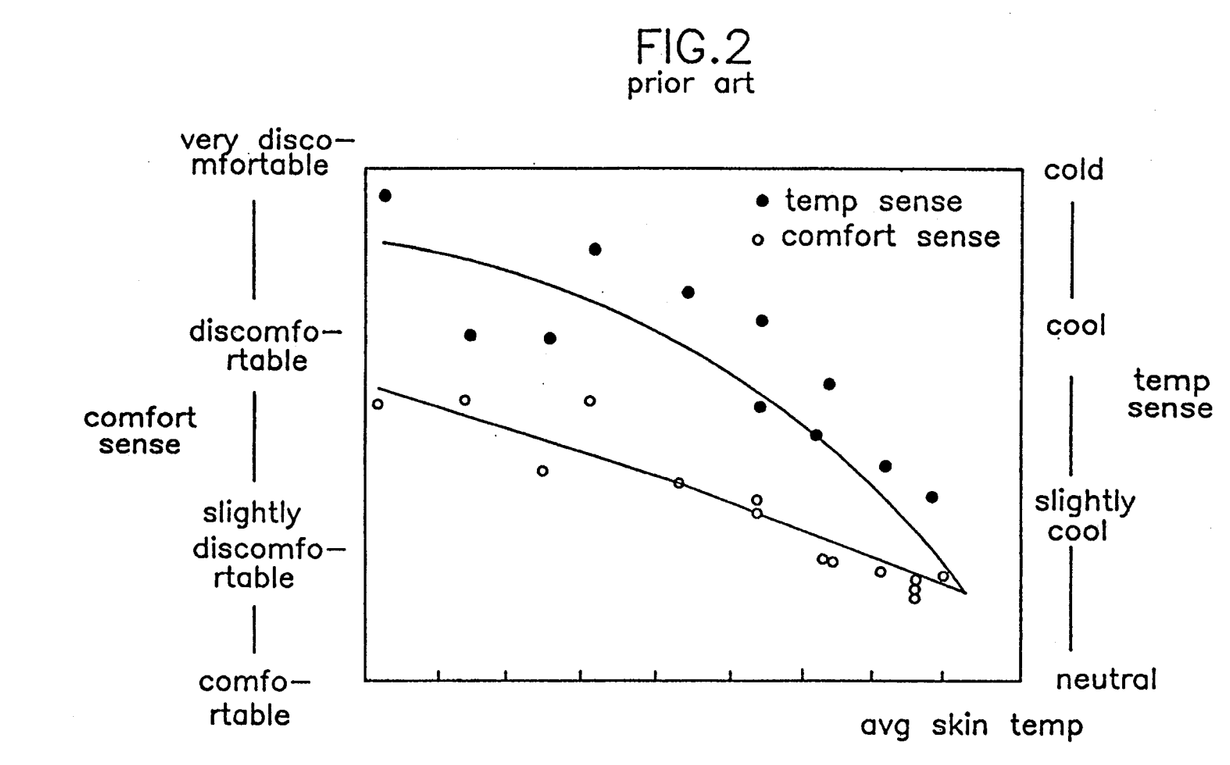
FIG. 2 is a graph illustrating the interrelation between a temperature and a comfort sense depending on an average skin temperature under cooling.
Figure 3:
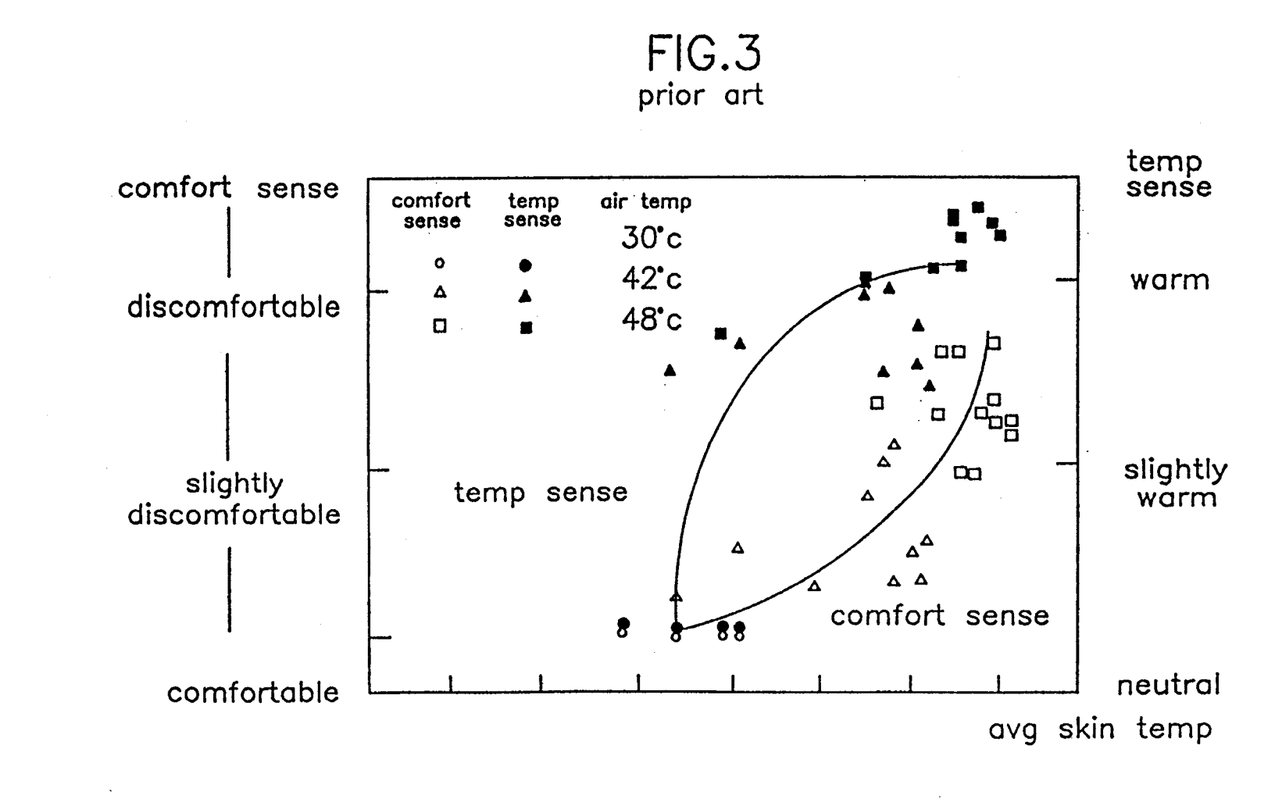
FIG. 3 is a graph illustrating the interrelation between the temperature sense and the comfort sense depending on an average skin temperature under heating.

FIG. 2 illustrates the interrelation between the temperature sense and the comfort sense depending on the average skin temperature at a low ambient temperature and FIG. 3 illustrates the interrelation between the temperature sense and the comfort sense at a high ambient temperature. Referring to FIG. 2 and FIG. 3, it can be known that a human temperature sense or comfort sense is closely related to a human skin temperature.

Figure 4:
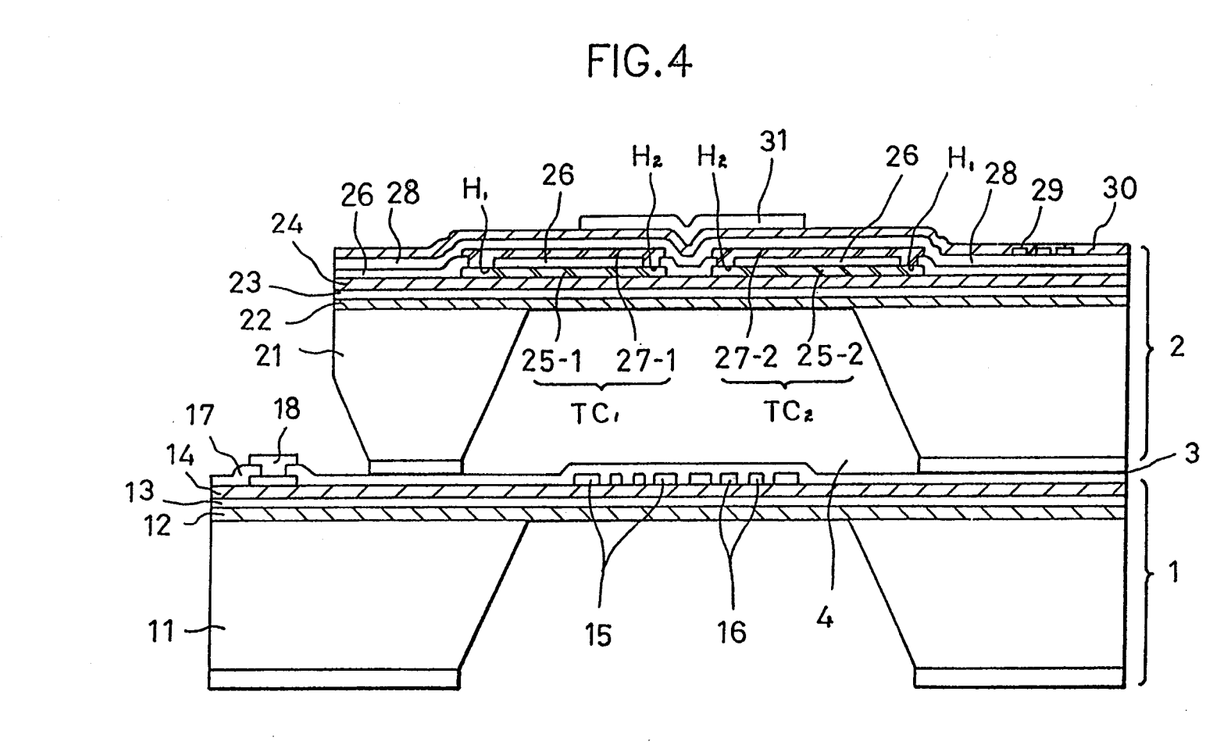
FIG. 4 is a schematic sectional view of a temperature comfort sensing device according to a first embodiment of the present invention.

FIG. 4 depicts a cross sectional structure of a temperature comfort sensing device according to first embodiment of the present invention. The temperature comfort sensing device has a structure in which two diaphragms 1 and 2 composed of membranes with 2 to 3 $\mu m$ thickness, respectively, adhere to each other through an adhesive 3 to form an air cavity therebetween.

The lower diaphragm (1) comprises a substrate (11), a layer (12) heavily doped with Boron ions, a $SiO_2$ layer (13) formed by a thermal oxidation, a $Si_3N_4$ layer (14) formed by a LPCVD and a $SiO_2$ layer 17. There are also included a thin film heater (15) for heating and a thin film metal temperature sensor (16) for temperature-adjustment.

The upper diaphragm (2) comprises a substrate (21), a layer (22) for etching-stop heavily doped with Boron ions, a $SiO_2$ layer (23), a $Si_3N_4$ layer (24), a thermopile (25-1, 25-2), $SiO_2$ layers (25, 26), a $SiO_2$ layer (28), a thin film temperature sensor (27) and a black body 31.

Figure 5A:
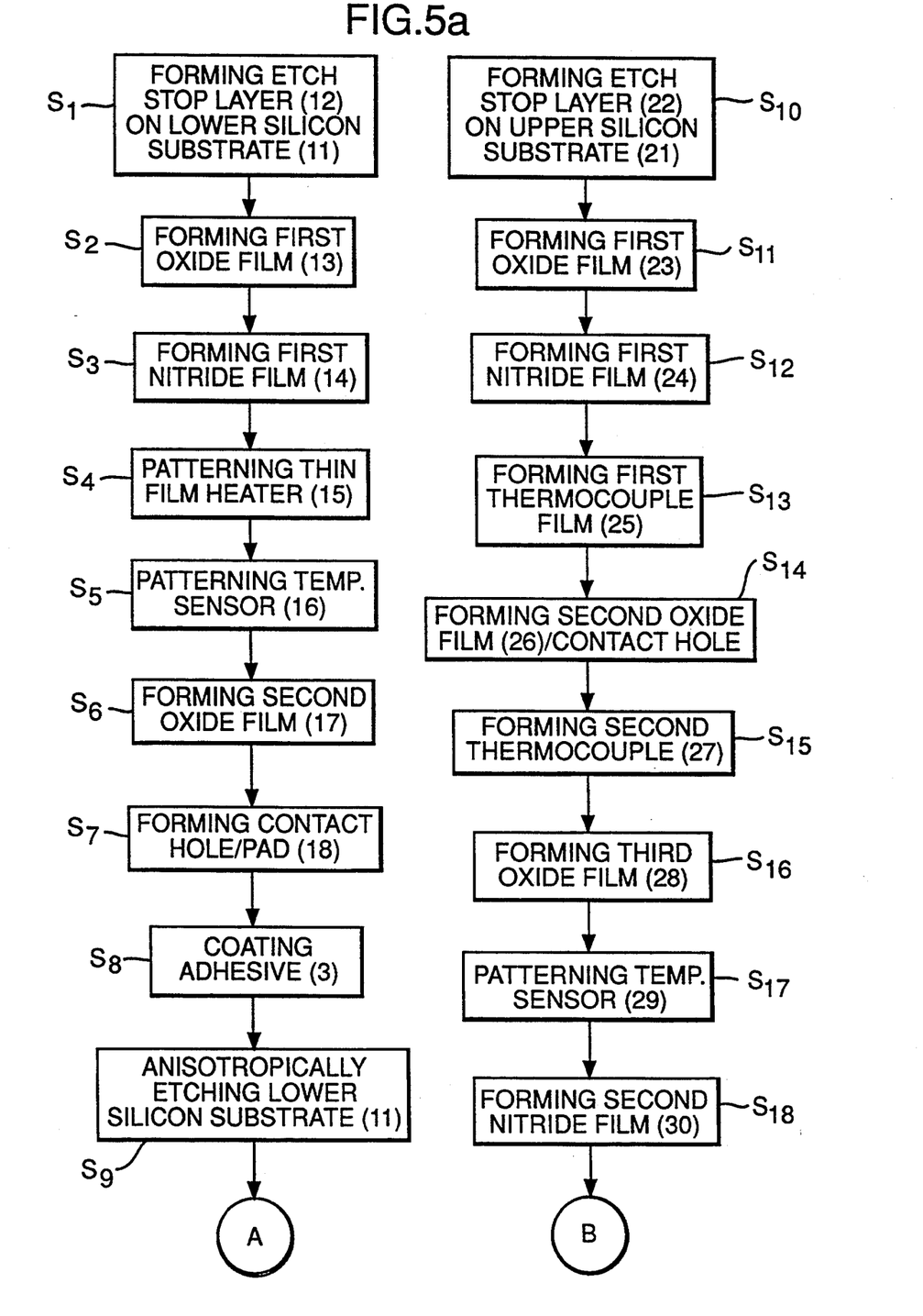
FIGS. 5a and 5b is a flow chart illustrating a process for manufacturing the temperature comfort sensing device according to the first embodiment of the present invention.
Figure 5B:
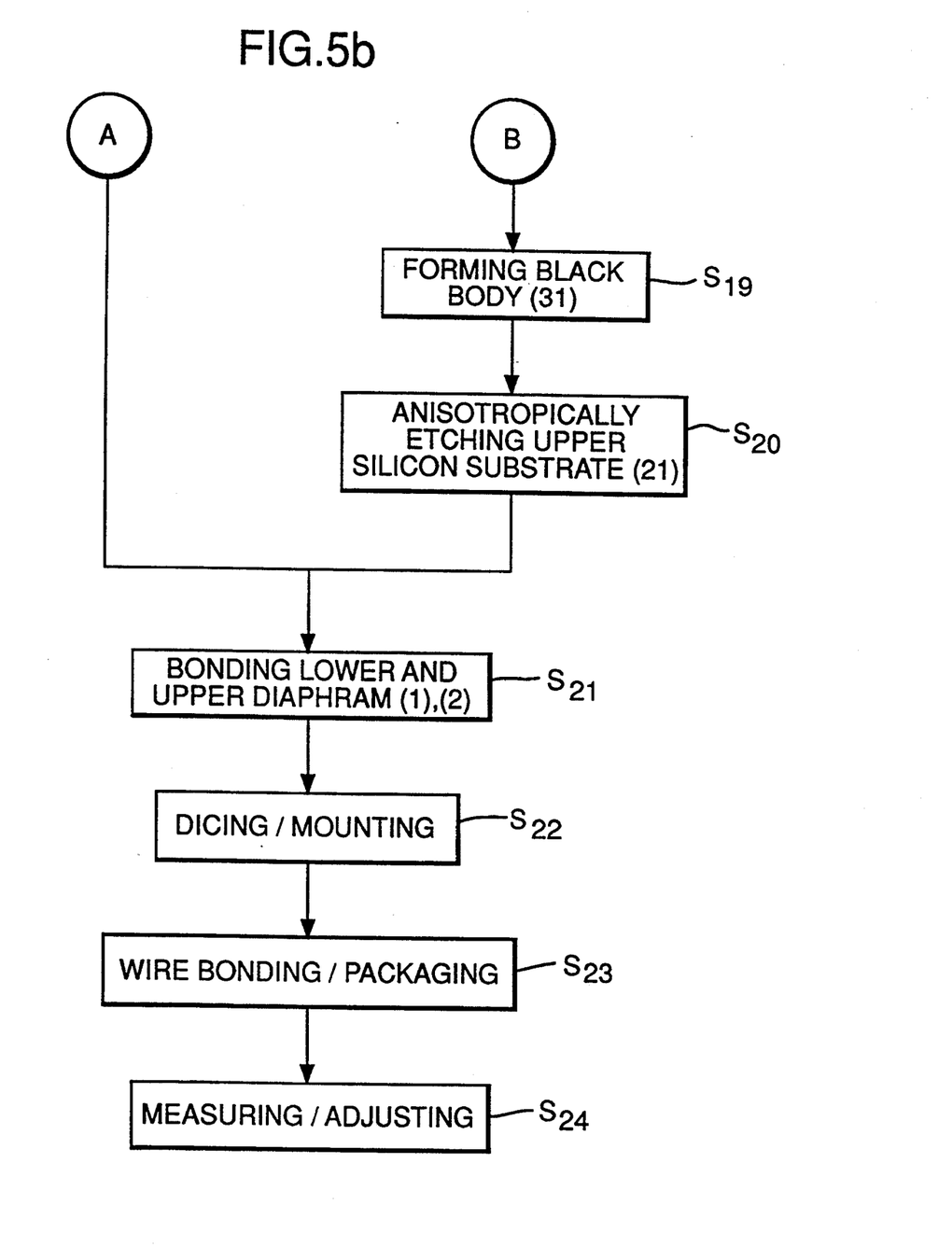

Referring to FIGS. 5a and 5b there is illustrated a process that these lower and upper diaphragm 1, 2 are manufactured and bonded to each other through an adhesive to produce the temperature comfort sensing device.

For manufacturing the lower diaphragm 1, a heavily doped layer 12 with boron ions is formed as an etch stop layer 12 on P type lower silicon substrate 11 (Step $S_1$) with a (100) orientation. Over the etch stop layer 12 are formed a first oxide film 12 and a first nitride film 14 by a thermal oxidation method and a low pressure CVD (LPCVD) method, respectively, in sequence (Step $S_2$ and Step $S_3$). Subsequently, the first nitride film 14 is coated with Ni—Fe alloy, using a spattering method and then patterned to form a thin film heater 15 with heating portions thereon (Step $S_5$).

A second oxide film 17 (Step $S_6$) is formed on the whole surface of the film 14. Subsequent to forming contact holes on one side of the film 17, a pad 18 is formed to be connected with the thin film heater 15 (Step $S_7$). Then, the surface, of the second oxide film 17 is coated with an adhesive 3 (Step $S_8$). The lower silicon substrate 11 is then etched anisotropically in an ethanediamine pyrocatechol water (EPW) mixture solution to form the lower diaphragm 1 (Step $S_9$).

The lower diaphragm 1, of which the total thickness is 2 to 3 $\mu m$ is at a mild tension state. The thin film heater 15 of Ni—Fe alloy are manufactured to attain a temperature increase of 100° C. at 12 mV. The thin film heater 15 is controlled by the temperature sensor 16, to maintain 36.5° C. equally to the body temperature.

The upper diaphragm 2 can be manufactured in the same manner as the lower diaphragm 1. A layer heavily doped with boron ions is formed as an etch stop layer 22 on a P type lower silicon substrate 21 with a (100) orientation (Step $S_{10}$). First oxide film 23 and first nitride film 24 are formed over the etch stop layer 22, using a heat oxidation method and a low pressure CVD (LPCVD) method, respectively (Step $S_{11}$, $S_{12}$). Thereafter, a pair of spaced first thermoelectric film patterns 25-1 and 25-2 are formed on the central portion of the film 24 (step $S_{13}$). Subsequent to forming a second oxide film 26 over the whole upper surface of the resultant structure including the first thermoelectric film patterns 25-1 and 25-2, contact holes are formed on the both upper potions of thermoelectric films 25-1 and 25-2, using a photoetching method.

Then, over a second oxide film 26 are formed a pair of spaced thermoelectric film patterns 27-1 and 27-2 so as to have the same width as the first thermoelectric film patterns 25-1 and 25-2. Each of the patterns 27-1 and 27-2 is connected with each corresponding one of the patterns 25-1 and 25-2 through the contact holes.

A pair of thermocouples $TC_1$ and $TC_2$ comprises the first thermoelectric film patterns 25-1 and 25-2 and the second thermoelectric film patterns 27-1 and 27-2, respectively.

Two-different metal of Sn/Bi is used for the material of these thermocouples $TC_1$ and $TC_2$.

Each of thermocouples $TC_1$ and $TC_2$ is structured to have hot junctions and cold junctions. As shown in FIG. 4, the cold junctions are portions at which each of the first thermoelectric film 25-1 and 25-2 is connected with each corresponding one of the second thermoelectric film 27-1 and 27-2 through outer first contact holes $H_1$ of the upper diaphragm 2. The hot junctions, whereas, are the portions at which each of the first thermoelectric film 25-1 and 25-2 is connected with each corresponding one of the second thermoelectric film 27-1 and 27-2 through inner second contact holes $H_2$ of the upper diaphragm 2. The structure is said to be a thermopile constituted by a plurality of thermocouples of the above-mentioned structures connected with one another.

In accordance with the first embodiment of the present invention, 72 hot junctions are provided for obtaining effective signals without using any separate amplifying circuit. These hot junctions in the thermocouples are connected with one another in series to maximize an output (an electromotive force).

Over the whole upper surface of the resultant structure including the thermocouples is formed a third oxide film 28 (Step $S_{16}$), one side of which a temperature sensor 29 is then formed (Step $S_{17}$). Over the whole upper surface of the resultant structure formed is then formed a second nitride film 30. A black body 31 is formed over the second nitride film 30, to overlap with one side of the thermocouples $TC_1$ and $TC_2$.

The black body 31 has a radiation rate close to 0.94, the radiation rate of human skin, and may be made of a metal such as Pt, Au or Ag.

After forming the black body 31, the upper silicon substrate 21 is etched anisotropically in an EPW mixture solution to perform the manufacture of the upper diaphragm 2.

The manufactured lower 1 and upper diaphragm 2 are aligned with each other by an aligning apparatus, fixed by a microgripper and then bonded to each other under a firing condition at 270° C. for 10 minutes (Step $S_{21}$).

Thereafter, a dicing/mounting process (Step $S_{22}$), a wire bonding/packaging process (Step $S_{23}$) and a measurement/adjustment process (Step $S_{24}$) are performed in sequence to manufacture a temperature comfort sensing device.

In the temperature comfort sensing device shown in FIG. 4, the thin film heater 15 generates heat, depending on the room temperature. The temperature of the thin film heater 15 is sensed by the temperature sensor 16 so that the thin film heater 15 can maintain a temperature identical to the human body temperature of 36.5° C.

The thin film heater 15 corresponds to an internal heat exchanging mechanism of a human being. The thermocouples serve to sense a skin temperature condition.

An air cavity 4 defined between the lower 1 and the upper diaphragm 2 accumulates the heat which occurs from the thin film heater 15 depending on the room temperature. The heat accumulated in the air cavity 4 is transferred to the thermocouples connected with one another in series so that the temperature comfort sensing device outputs an electromotive force caused by the transferred heat. Thus, the output voltage from the temperature comfort sensing device reflects a thermal environment in situ. PMV values are simply calculated by correcting this output dependent on a room temperature sensed by the temperature sensor 30.

The temperature comfort sensing device of the preferred embodiments of the present invention, that is to say, makes it possible to analogize a correct PMV value for various thermal environments, by performing a temperature correction based on a room temperature sensed by the temperature sensor, a humidity correction by a hybrided humidity sensor, a dress amount correction by correcting a thermal resistance coefficient by the time of year and day and according to a proper program, and a metabolic rate correction by the use of an infrared ray activity sensor or an analogization of daily life pattern.

Figure 6:
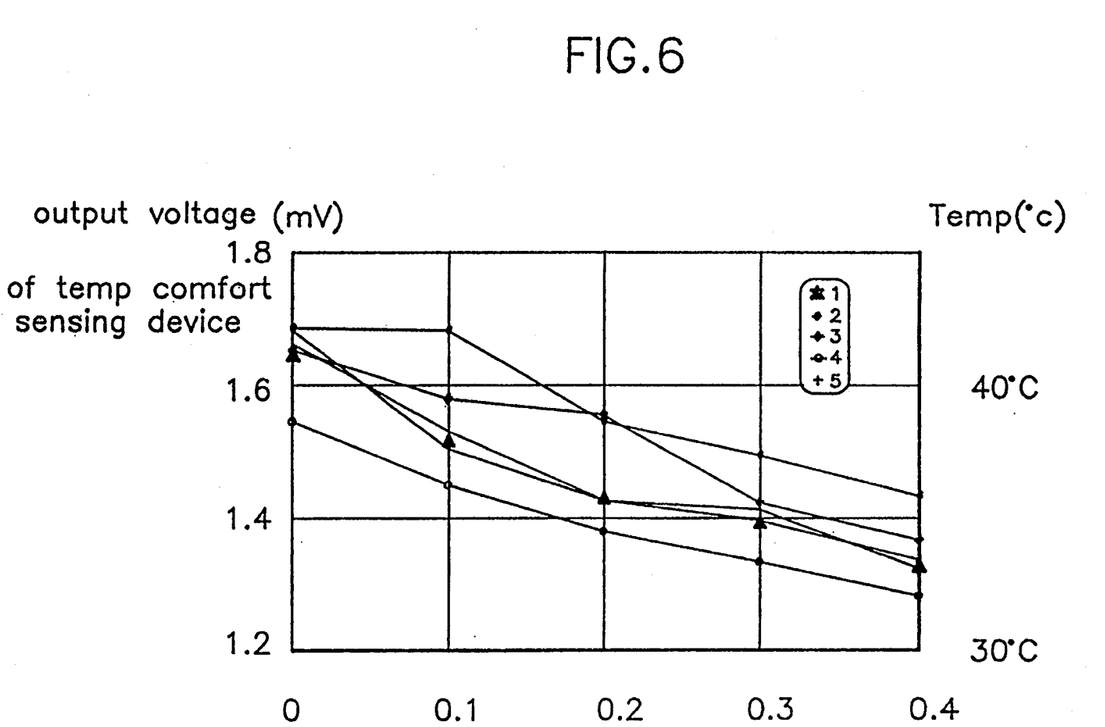
FIG. 6 is graphs illustrating a characteristic of the temperature comfort sensing device of the present invention.

FIG. 6 shows graphs illustrating a characteristic of the temperature comfort sensing device of the present invention. The graphs show a variation in temperature at the surface of upper diaphragm 2 depending on an air flow rate.

The illustrated conditionors are as follows:
No. 1, Room: 30° C. (36%), Air: 30° C. (36%)
No. 2, Room: 30° C. (36%), Air: 40° C. (36%)
No. 3, Room: 30° C. (36%), Air: 30° C. (36%)
  Cold Wall Temperature: 20° C.
No. 4, Room: 30° C. (36%), Air: 30 ° C. (36%)
No. 5, Room: 30° C. (36%), Air: 30° C. (36%).

Referring to the condition Nos. 1 and 3, it can be found that the output value of the temperature comfort; sensing device depending on the air flow rate is reduced in the case where a cold wall of 20° C. is installed, as compared with the case where no cold wall is installed, even at the same room condition of 30° C. (36%) and the same air condition of 30° C. (36%). That is, the temperature comfort sensing device is highly sensitive to both a slight variation in air flow and a variation in wall temperature at a distance of 30 cm.

Figure 7:
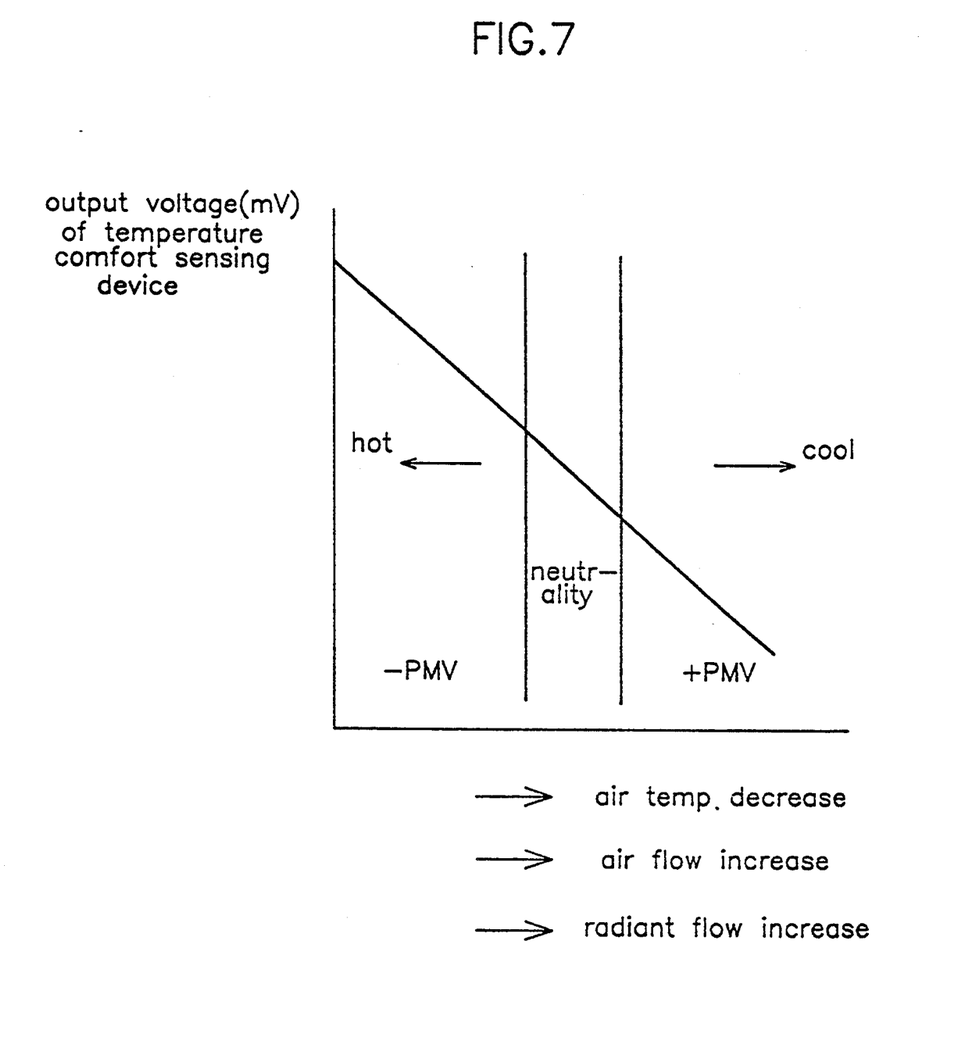
FIG. 7 is a graph illustrating a predicted output value (voltage) of the temperature comfort sensing device according to the first embodiment of the present invention, depending on various complex environmental variations.

FIG. 7 is a graph illustrating a predicted output value (voltage) of the temperature comfort sensing device of the present invention, depending on various complex environmental variations. As apparent from FIG. 7, the output value varies substantially in linear, by a complex environmental variation. As the number of environment varying factors increases, the output value is reduced, as shown in Table 1. In this case, it is possible to analogize an average skin temperature at which a human being feels comfortable. In FIG. 7, such a skin temperature is included in a scope the human temperature sense becomes neutral.

Therefore, the output value of the temperature comfort sensing device of the present invention is the value capable of reflecting thermal environments in an in-situ manner. By partially correcting this value, the PMV value can be simply derived.

Figure 8:
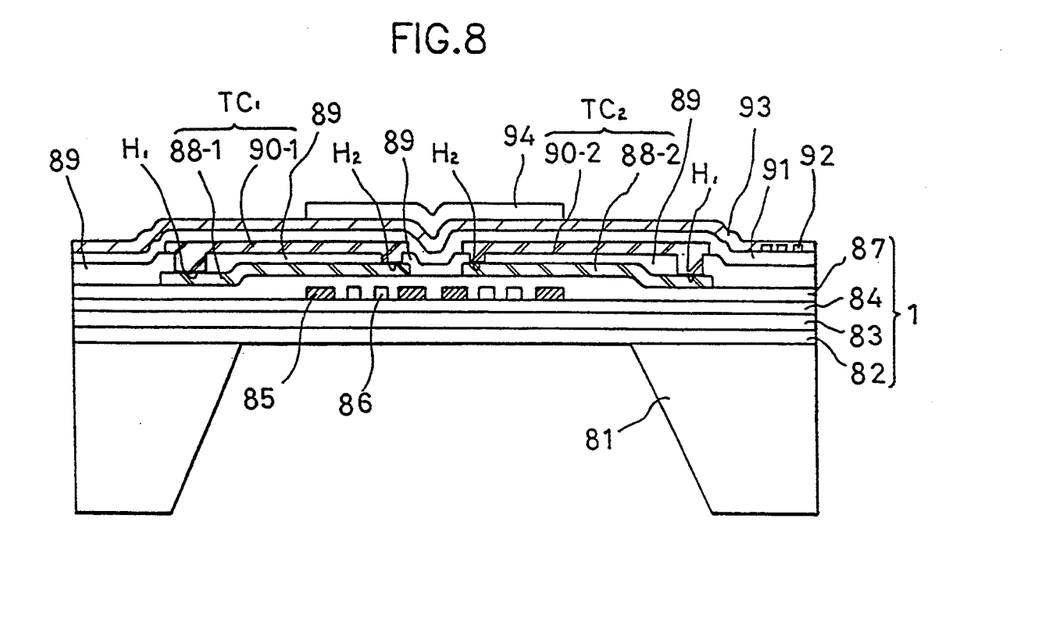
FIG. 8 is a schematic sectional view of a temperature comfort sensing device according to a second embodiment of the present invention.

FIG. 8 is a schematic sectional view of a temperature comfort sensing device according to a second embodiment of the present invention.

The temperature comfort sensing device of this embodiment is different from that of the first embodiment, in that it comprises only the lower diaphragm 1. In the second embodiment, the thermocouple TC is directly formed above the thin film heater 85 of the lower diaphragm 1, as compared with the first embodiment wherein the thermocouple TC is formed on the upper diaphragm 2.

The manufacture of the temperature comfort sensing device with the above-mentioned structure will now be described in conjunction with FIGS. 9A to 9D.

FIGS, 9A to 9D are schematic sectional views illustrating a process for manufacturing the temperature comfort sensing device according to the second embodiment.

Figure 9A:
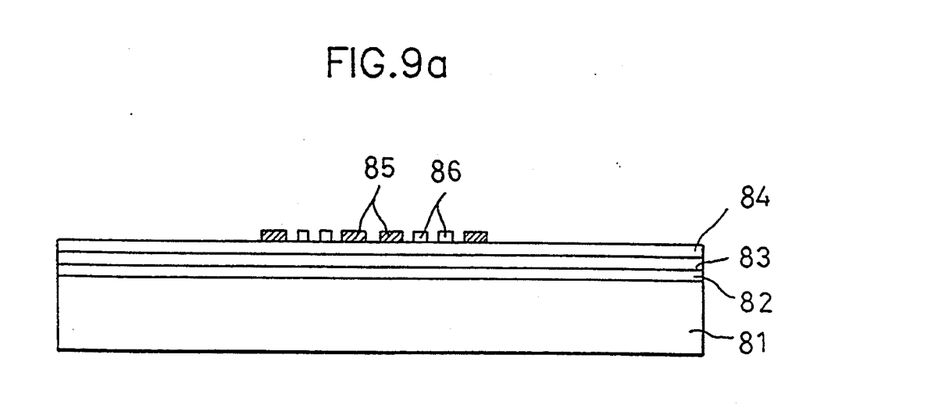
FIGS. 9A to 9D are schematic sectional views illustrating a process for manufacturing the temperature comfort sensing device according to the second embodiment of the present invention.

Over a P type lower silicon substrate 81 with a (100) orientation, first, a layer heavily doped with boron ions is formed as an etch stop layer 82, as shown in FIG. 9A. Over the etch stop layer 82, a first oxide film 83 and a first nitride film 84 are sequentially deposited, using the thermal oxidation method and the LPCVD method, respectively.

On the first nitride film 84 are then formed a thin film heater 85 made of Fe—Ni alloy or Au and a temperature sensor 86.

Figure 9B:
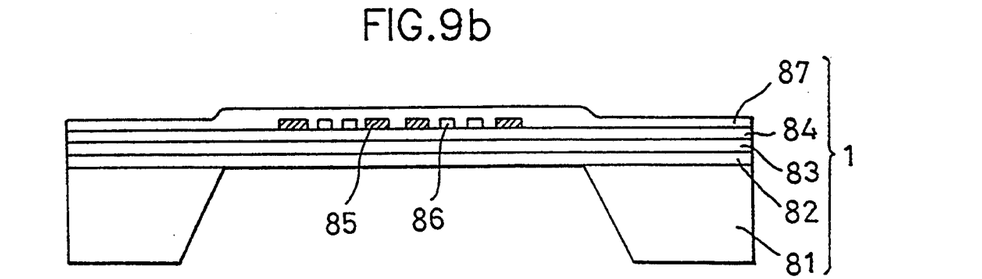

A second nitride film 87 is deposited over the whole upper surface of the resultant structure including the thin film heater 85 and the temperature sensor 86, as shown in FIG. 9B. Beneath the substrate 81, an oxide film (not shown) is also formed to provide an etching window. The resultant structure is then subjected to an anisotropic etching in an anisotropic etch solution. After the anisotropic etching, the oxide film is removed from the structure so that the lower diaphragm 1 can be obtained, as shown in FIG. 9B.

Figure 9C:
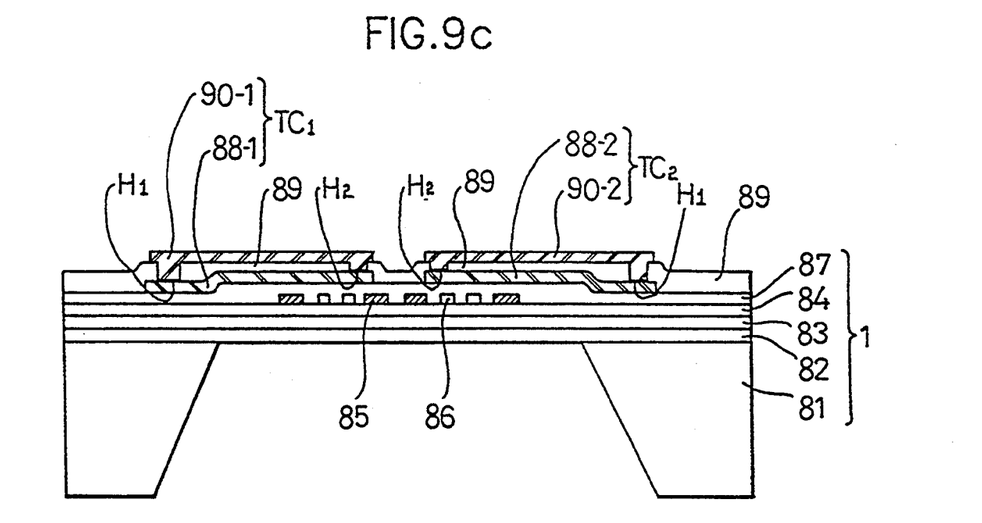

On the lower diaphragm 1 are then formed a pair of spaced first thermoelectric film patterns 88-1 and 88-2, as shown in FIG. 9C. Subsequently, a second oxide film 89 is deposited over the whole upper surface of the resultant structure including the first thermoelectric film patterns 88-1 and 88-2. The second oxide film 89 is subjected to a photoetching so that opposite side portions of each of the first thermoelectric film patterns 88-1 and 88-2 have contact holes $H_1$ and $H_2$ at their upper surfaces, respectively.

Then, a pair of second thermoelectric film patterns 90-1 and 90-2 are formed over portions of the second oxide-film 89 disposed over the first thermoelectric film patterns 88-1 and 88-2, respectively, to have the same width as the first thermoelectric film patterns 88-1 and 88-2. Each of the second thermoelectric film patterns 90-1 and 90-2 is connected with each corresponding one of the first thermoelectric film patterns 88-1 and 88-2 via the contact holes $H_1$ and $H_2$. Thus, a pair of thermocouples $TC_1$ and $TC_2$ are obtained, each of which has a structure including each corresponding one of the first thermoelectric film patterns 88-1 and 88-2 and each corresponding one of the second thermoelectric film patterns 90-1 and 90-2 connected to each other via the contact holes $H_1$ and $H_2$.

In similar to the first embodiment, the thermocouples $TC_1$ and $TC_2$ of the second embodiment are structured to have hot junctions and cold junctions. In accordance with the second embodiment, therefore, 100 thermocouples are provided for obtaining effective signal s without using any separate amplifying circuit.

The material of these thermocouples $TC_1$, and $TC_2$ may be comprised of a two-different metal such as Bi/Sb, Ni—Cu alloy/Cu or BiTe(N)/BiTe(P). Other two separate materials of polysilicon doped with boron ions and Al may be also used.

Figure 9D:
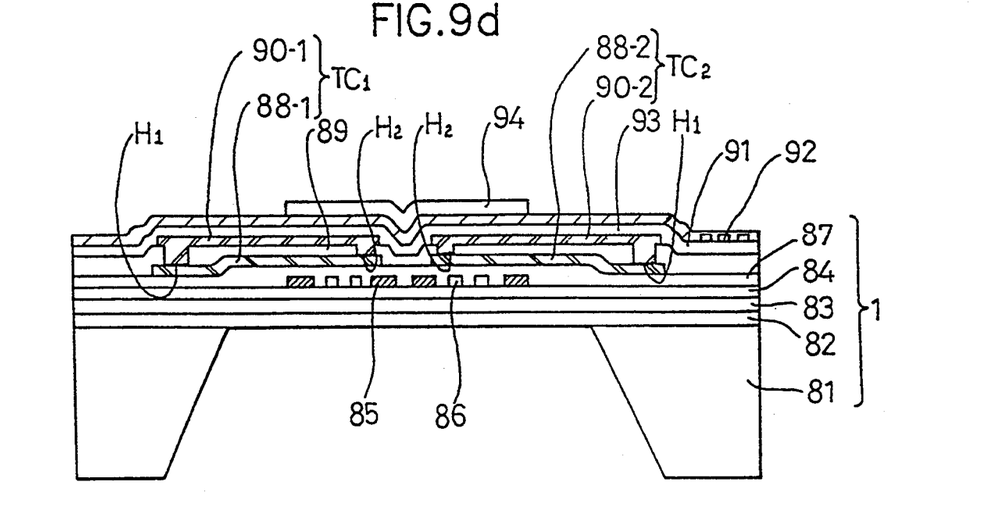

Thereafter, a third oxide film 91 is formed over the whole upper surface of the resultant structure including the thermocouples $TC_1$ and $TC_2$, as shown in FIG. 9D. A temperature sensor 92 for sensing the room temperature is then formed at one side portion of the third oxide film 91. Over the whole upper surface of the resultant structure is former a third nitride film 93 on which a black body 94 is then formed. Thus, a temperature comfort sensing device is obtained. The black body 94 serves to increase the heat radiation amount at the surface of the temperature comfort sensing device. The material of the black body 94 is comprised of Au Pt, As, or Ni—Cr alloy.

Figure 10:
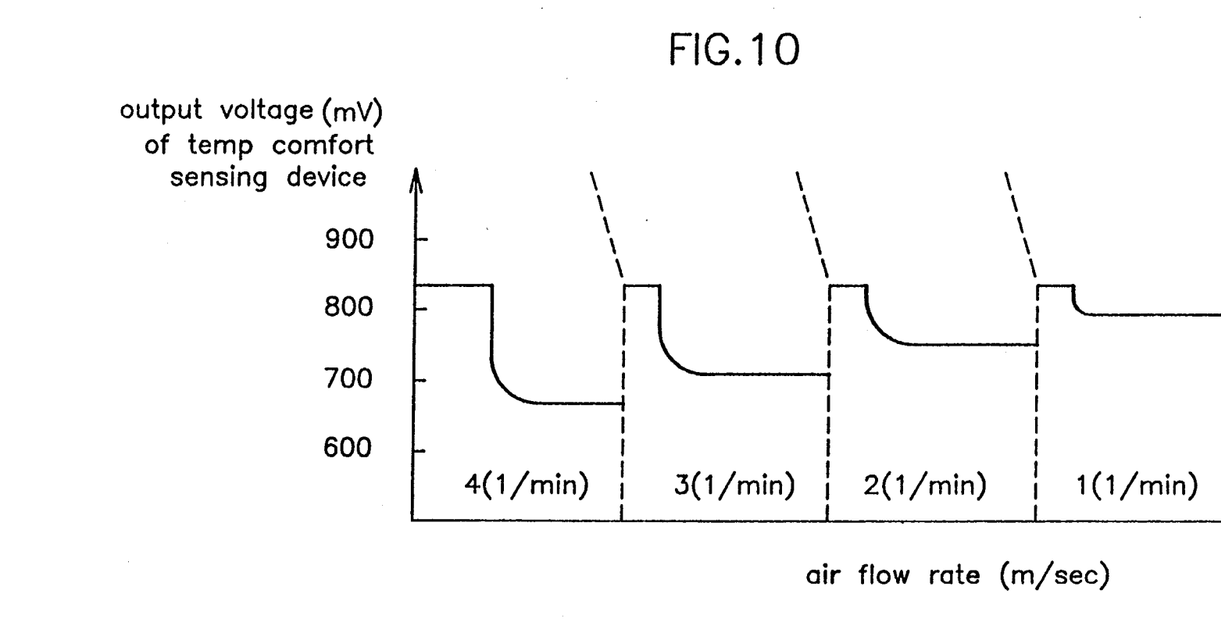
FIG. 10 is graphs illustrating a variation in output value of the temperature comfort sensing device of FIG. 8 depending on an air flow rate.

As shown in FIG. 10, the temperature comfort, sensing device fabricated in the above-mentioned manner outputs electrical signals effective to application, depending on a variation in air flow rate, without using any amplifying circuit.

Figure 11:
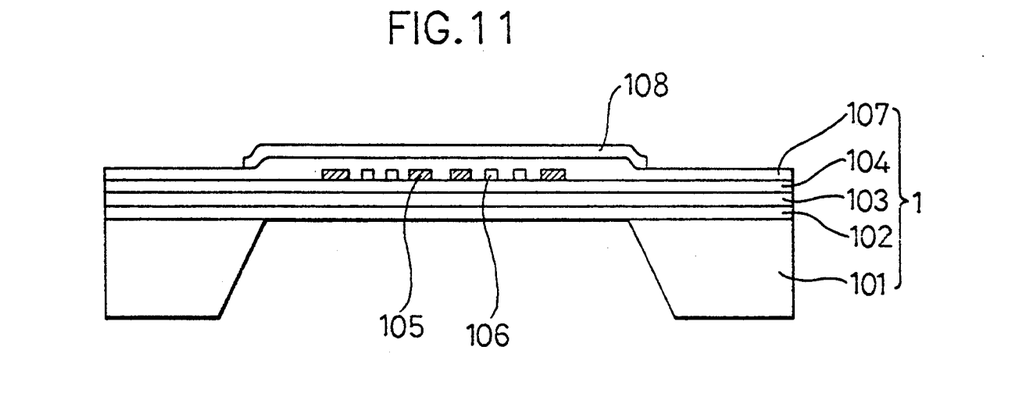
FIG. 11 is a schematic sectional view of a temperature comfort sensing device according to a third embodiment of the present invention.

FIG. 11 is a schematic sectional view of a temperature comfort sensing device according to a third embodiment of the present invention. In this embodiment, the temperature comfort sensing device does not comprise the thermocouples $TC_1$ and $TC_2$ and the room temperature sensor 92, as different from the second embodiment. The temperature comfort sensing device of the third embodiment comprises only the thin film heater 105 and temperature sensor 106.

For manufacturing this temperature comfort sensing device, first, over a substrate 101 previously subjected to an anisotropic etching are formed an etch stop layer 102, a first oxide film 103 and a first nitride film 104, in this order, as shown in FIG. 11. Thereafter, a thin film heater 105 and a temperature sensor 106 are formed at the central portion of the first nitride film 104. Over the whole upper surface of the resultant structure is formed a second nitride film 107 on which a black body 108 is subsequently formed. Thus, the temperature comfort sensing device is obtained.

The temperature sensor 106 is made of a thin film resistance material.

Figure 12:
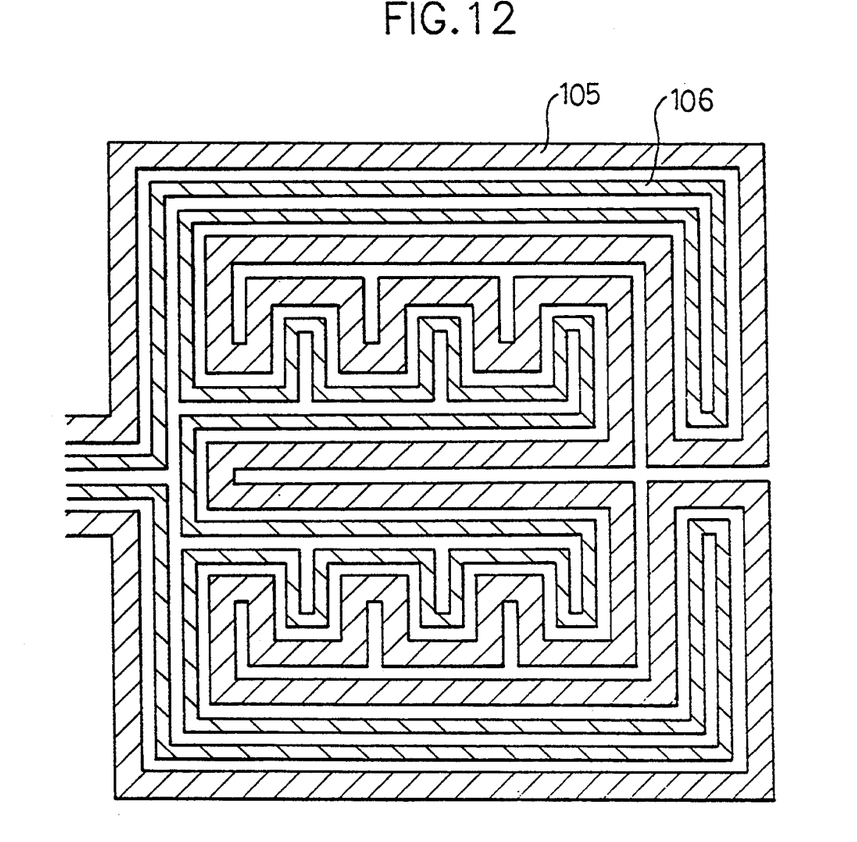
FIG. 12 is a schematic plan view illustrating respective patterns of a thin film heater and a temperature sensor in tile temperature comfort sensing device of FIG. 11.

In the temperature comfort sensing device with the above-mentioned structure, the thin film heater 105 and the temperature sensor 106 have patterns shown in FIG. 12. Since the temperature comfort sensing device of the third embodiment includes no thermopile for connecting a plurality of thermocouples, it is required to provide a separate module for amplifying and linearizing an output signal from the temperature comfort sensing device. Such a module is illustrated in FIG. 13.

Figure 13:
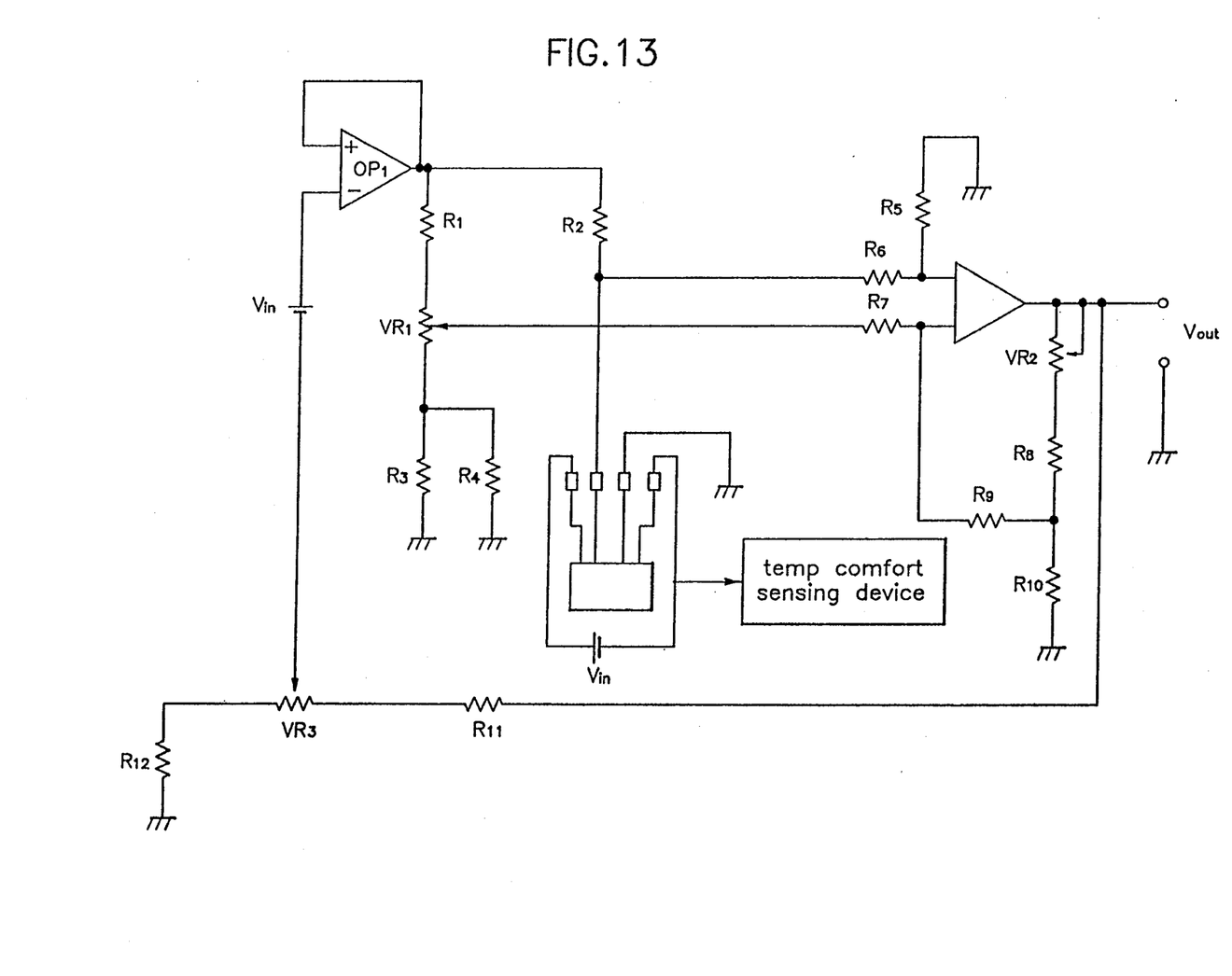
FIG. 13 is a circuit diagram of a module to which the temperature comfort sensing device of FIG. 11 is applied.

In the module shown in FIG. 13, a voltage difference between resistors $R_3$ and $R_4$ is amplified by an OP amplifier $OP_1$. Basically, the module tries to achieve a linearization by an output value fed back to an amplifying circuit, for the temperature-measuring resistors. The linearity is adjusted by a variable resistor $VR_3$.

As apparent from the above description, the preferred embodiments of the present invention provide a temperature comfort sensing device capable of detecting human temperature comfort sensitivity to thermal environments, nearly in equal to the human beings. Where the temperature comfort sensing device is applied to air conditioning devices, it provides an advantage of efficiently achieving a comfortable air conditioning.

In accordance with the present invention, it is also possible to construct the temperature comfort sensing device by using a single diaphragm and thus achieve a reduction in manufacture cost and an increase in yield. Also, a compactness can be achieved, in the number of sensors can be reduced.

Although the preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A temperature comfort sensing device comprising:
   a first diaphragm defining a first recess, the first diaphragm further including
      a thin film heater over the first recess for generating heat; and
      a temperature sensor for controlling a temperature of the thin film heater; and
   a second diaphragm defining a second recess, the second diaphragm further including a thermopile over the second recess for generating an electromotive force depending on the heat generated by the thin film heater.

2. A temperature comfort sensing device in accordance with claim 1, further including an adhesive, wherein the first diaphragm is bonded to the second diaphragm by the adhesive.

3. A temperature comfort sensing device in accordance with claim 2, wherein the second recess is configured as an air cavity for accumulating the heat generated from the thin film heater.

4. A temperature comfort sensing device in accordance with claim 1, wherein the first and second diaphragms each includes a micro film with an average thickness of 2 to 3 $\mu m$.

5. A temperature comfort sensing device in accordance with claim 1, wherein the first diaphragm includes
a first oxide film over the first recess,
a first nitride film over the first oxide film, wherein the thin film heater and the temperature sensor are on the first nitride film, and wherein the device further includes
a second oxide film over the thin film heater and temperature sensor.

6. A temperature comfort sensing device in accordance with claim 5, wherein the first diaphragm includes a P type silicon layer having a surface with a (100) orientation.

7. A temperature comfort sensing device in accordance with claim 5, further including an etch stop layer over the first recess, the etch stop layer including an impurity layer heavily doped with boron ions.

8. A temperature comfort sensing device in accordance with claim 5, wherein the thin film heater includes a Ni—Fe alloy.

9. A temperature comfort sensing device in accordance with claim 1, wherein the second diaphragm includes
a first oxide film over the second recess;
a first nitride film over the first oxide film,
wherein the thermopile is on the first nitride film, and wherein the device further includes
a second oxide film over the first nitride film and contacting the thermopile;
a third oxide film over both the second oxide film and the thermopile;
a temperature sensor contacting the third oxide film;
a second nitride film on the temperature sensor; and
a black body on the second nitride film.

10. A temperature comfort sensing device in accordance with claim 9, wherein the second diaphragm includes a P type silicon layer having a surface with a (100) orientation.

11. A temperature comfort sensing device accordance with claim 9, further including an etch stop layer over the second recess, the etch stop layer including an impurity layer heavily doped with boron ions.

12. A temperature comfort sensing device in accordance with claim 9, wherein the thermopile includes a first thermoelectric film having a first width and a second thermoelectric film, coupled to the first thermoelectric film, having a width substantially equal to the first width.

13. A temperature comfort sensing device in accordance with claim 12, wherein the first and second films include Sn and Bi.

14. A temperature comfort sensing device in accordance with claim 9, wherein the black body has a heat radiation amount approximately substantially equal to that of a human skin.

15. A temperature comfort sensing device in accordance with claim 14, wherein the black body includes a body selected from a group consisting of Pt, Au ad Ag.

16. A temperature comfort sensing device comprising:
a lower diaphragm defining a first recess, the lower diaphragm further including a thin film heater over the first recess for generating heat depending on a room temperature and a temperature sensor for controlling a temperature of said thin film heater; and
an upper diaphragm defining a second recess, the upper diaphragm further including a thermopile over the second recess for generating an electromotive force depending on said heat generated from the thin film heater.

* * * * *